US010296403B2

(12) United States Patent
Cook et al.

(10) Patent No.: US 10,296,403 B2
(45) Date of Patent: May 21, 2019

(54) SOFTWARE DEVELOPMENT KIT PLATFORM

(71) Applicant: Google LLC, Mountain View, CA (US)

(72) Inventors: Sean Cook, San Francisco, CA (US); Jeffrey H. Seibert, Jr., San Francisco, CA (US); Alex Roetter, San Francisco, CA (US); Kevin Weil, San Francisco, CA (US); Akash Garg, San Francisco, CA (US); Jeremy Gordon, San Francisco, CA (US); Christian Oestlien, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/592,450

(22) Filed: May 11, 2017

(65) Prior Publication Data

US 2017/0249198 A1 Aug. 31, 2017

Related U.S. Application Data

(63) Continuation of application No. 15/307,511, filed as application No. PCT/US2015/028232 on Apr. 29, 2015, now Pat. No. 10,042,684.

(Continued)

(51) Int. Cl.
*G06F 9/44* (2018.01)
*G06F 9/54* (2006.01)
*G06F 8/70* (2018.01)

(52) U.S. Cl.
CPC ............... *G06F 9/547* (2013.01); *G06F 8/70* (2013.01)

(58) Field of Classification Search
USPC ....................................................... 717/104
See application file for complete search history.

(56) References Cited

U.S. PATENT DOCUMENTS

2013/0111328 A1 5/2013 Khanna et al.
2013/0283274 A1 10/2013 Mimran
(Continued)

OTHER PUBLICATIONS

International Search Report issued in PCT/US2015/028232, dated Jul. 15, 2015, 3 pages.
(Continued)

*Primary Examiner* — Chuck O Kendall
(74) *Attorney, Agent, or Firm* — Fish & Richardson P.C.

(57) ABSTRACT

A computing system including a first and a second application. The first application includes a first local software development kit (SDK) platform instance, and the first local SDK platform instance includes a first non-core SDK module instance, an application discovery module, and an inter-application communication module. The second application includes a second local SDK platform instance. The first non-core SDK module instance is configured to is a request to the application discovery module. Upon receipt of the request, the discovery module is configured to determine that the second local SDK platform instance includes a second non-core SDK module instance that is configured to service the request. The first local SDK platform instance, based on the determination, is configured to generate a deep link associated with the second application based on data collected by the first local SDK platform instance and provide the deep link to the first non-core SDK module.

20 Claims, 6 Drawing Sheets

Related U.S. Application Data (60) Provisional application No. 61/986,815, filed on Apr. 30, 2014.

(56) References Cited

U.S. PATENT DOCUMENTS

| | | | |
|---|---|---|---|
| 2017/0180229 A1* | 6/2017 | Toksoz | H04L 43/0876 |
| 2017/0249198 A1* | 8/2017 | Cook | G06F 9/547 |

OTHER PUBLICATIONS

Written Opinion of the International Searching Authority issued in PCT/US2015/028232, dated Jul. 15, 2015, 5 pages.

"Application Fundamental," developer.android.com, Apr. 7, 2014 (Apr. 7, 2014), pp. 1-6, XP002741744, Retrieved from the Internet: URL https://web.archive.org/web/20140407041713/http://developer.android.com/guide/components/fundamental.html [retrieved on Jul. 31, 2015] 7 pages.

Summons to Attend Oral Proceedings issued in European Application No. 14823369.3, mailed on Jun. 4, 2018, 8 pages.

Office Action issued in European Application No. 15723369.3 dated Nov. 21, 2017, 8 pages.

'webmasters.googleblog.com' [online] "Official Google Webmaster Central Blog: Indexing apps just like websites," Lawrence Chang, Oct. 31, 2013 [retrieved on Nov. 15, 2017] Retrieved from Internet: URL<https://webmasters.googleblog.com/2013/10/indexing-apps-kist-like-websites.html> 4 pages.

'mobiledeeplinking org' [online] "Mobile.deep.linking" Anonymous, Mar. 6, 2014, [retrieved on Nov. 15, 2017] Retrieved via the Wayback Machine at Internet: URL<https://web.archive.org/web/20140306214853/http://mobiledeeplinking.org> 10 pages.

'developer.android.com' [online] "Application Fundamentals," Apr. 7, 2014, [retrieved on Nov. 29, 2017] Retrieved via the Wayback Machine at Internet URL<https://web.archive.org/web/20140407041813/http://developer.android.com/guide/components/fundamentals.html> 8 pages.

* cited by examiner

SOFTWARE DEVELOPMENT KIT PLATFORM

CROSS-REFERENCE TO RELATED APPLICATION

This application is a continuation application of U.S. application Ser. No. 15/307,511, filed Oct. 28, 2016, which claims priority to PCT/US2015/028232 filed Apr. 29, 2015, which claims priority under 35 U.S.C. 119(e) of U.S. Provisional Patent Application Ser. No. 61/986,815, filed on Apr. 30, 2014, all of which are hereby incorporated by reference.

BACKGROUND

Applications may be built using software development kits (SDKs).

SUMMARY

In general, in one aspect, one or more embodiments of the invention relate to a computing system, comprising: a first application comprising a first local software development kit (SDK) platform instance, wherein the first local SDK platform instance comprises a first non-core SDK module instance, an application discovery module, and an inter-application communication module; a second application comprising a second local SDK platform instance, wherein the first non-core SDK module instance is configured to issue a request to the application discovery module, wherein, upon receipt of the request, the discovery module is configured to determine that the second local SDK platform instance comprises a second non-core SDK module instance that is configured to service the request, wherein the first local SDK platform instance, based on the determination, is configured to: generate a deep link associated with the second application based on data collected by the first local SDK platform instance and provide the deep link to the first non-core SDK module.

In another aspect, one or more embodiments of the invention relate to a method for using servicing requests, comprising: receiving a deep link from a local SDK platform instance in a first application; receiving an indication that the deep link has been selected by a user of the first application; and triggering, in response to the indication, a launching of a second application, wherein the first application and the second application are both installed on a computing system, and wherein the deep link is generated using data obtained by at least one non-core SDK module instance in the first application.

In yet another aspect, one or more embodiments of the invention relate to a non-transitory computer readable medium comprising computer readable program code for: receiving a deep link from a local SDK platform instance in a first application; receiving an indication that the deep link has been selected by a user of the first application; and triggering, in response to the indication, a launching of a second application, wherein the first application and the second application are both installed on a computing system, and wherein the deep link is generated using data obtained by at least one non-core SDK module instance in the first application.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In the following description a local software development kit (SDK) platform may refer to either the local SDK platform shown in FIG. 2 or the local SDK platform instances shown in FIG. 4A-B.

In general, one or more embodiments of the invention relate to a SDK platform. The SDK platform includes: (i) a SDK platform backend and (ii) a local SDK platform and/or local SDK platform instances that operates on top of the existing operating system on a computing system. Further, in one or more embodiments of the invention, the SDK platform provides mechanisms that enable sharing data amongst other applications that implement SDK modules supported by the SDK platform. In one or more embodiments of the invention, the SDK platform provides a standardized way of communicating between applications such that a developer of one application can call a targeted action inside another application in a consistent manner. Furthermore, the consistent usage of the SDK platform and of SDKs supported by the SDK platform may enable a remote 3.sup.rd party (e.g., a 3.sup.rd party that is deploying the SDK platform) to accurately determine if an application is installed on a user's device (also referred to as a computing system). The SDK platform also facilitates communication of data between the SDK platform backend and the local SDK platform and/or local SDK platform instances.

Figure 1:
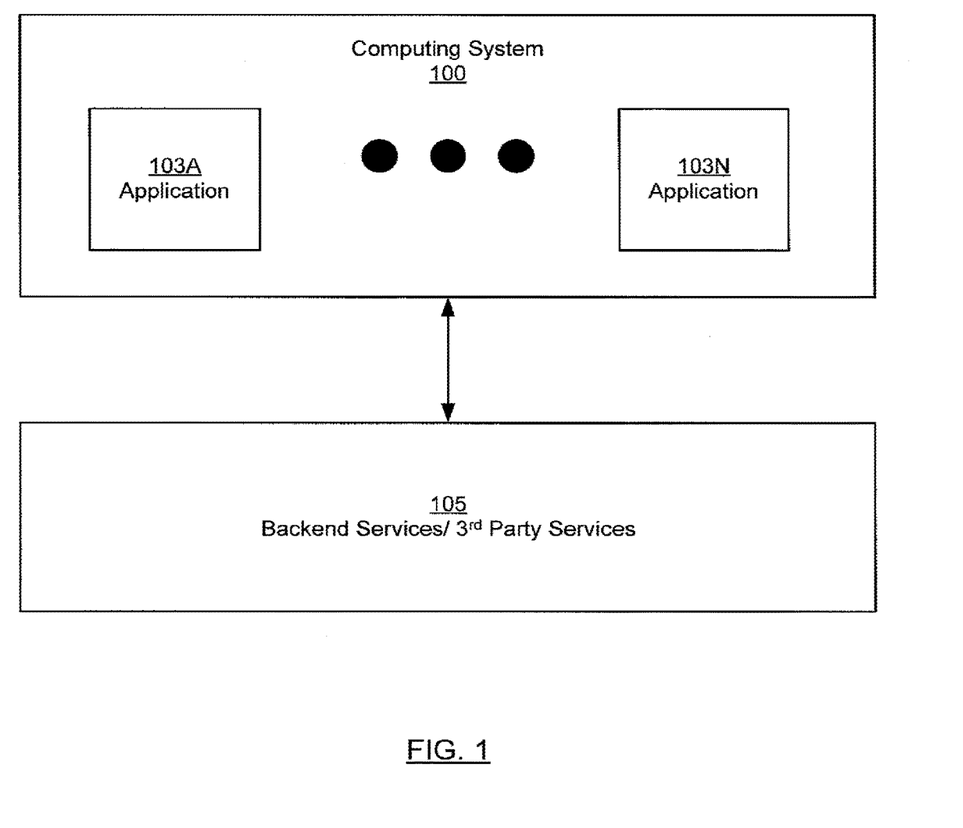
FIG. 1 shows a system in accordance with one or more embodiments of the invention.

FIG. 1 shows a system in accordance with one or more embodiments of the invention. The system includes a computing system (100) (see e.g., FIG. 5)) operatively connected to backend services (also referred to as a SDK platform backend) and/or 3.sup.rd party services (105). In one embodiment of the invention, the backend services (105) correspond to computing services that are remotely accessible to local SDK platform (see e.g., FIG. 2) and/or the local SDK platform instances (see e.g., FIG. 4A-4B). The backend services (105) may be implemented by the same entity that generated and/or distributed the SDK modules (see e.g., FIGS. 2, 4A and 4B). The backend services (105) may be implemented on one or more computing systems. The 3.sup.rd party services (105) correspond to all other remote computing services (excluding those provided by the backend services), where such 3.sup.rd party services are implemented using one or more computing systems (described below in FIG. 5). Various non-limiting examples of backend services and/or 3.sup.rd party services (105) are described below.

In one embodiment of the invention, the computing system (100) may directly communicate only with the backend service. In such cases, if an application on the computing system is attempting to communicate with a 3.sup.rd party service, then such requests are sent to the backend service, which subsequently sends the requests to the 3.sup.rd party service. In other embodiments of the invention, the computing system may communicate directly with the 3.sup.rd services. In other embodiments of the invention, the computing system may implement both of the aforementioned embodiments.

In one embodiment of the SDK platform backend (105) provides support services for SDKs. For example, the SDK platform may provide a marketplace for SDKs and provide server side services for executing non-core SDK module instances (described below). In other words, an SDK developer may create non-core SDK module instance and send the non-core SDK module instance to the SDK platform backend. The SDK platform backend may provide SDK marketplace services, such that a software application developer may purchase or otherwise obtain the non-core SDK module instance and incorporate the non-core SDK module instance into a software application. A SDK module (e.g., a non-core SDK module instance) is a set of software development tools that assists in the creation of software applications. The SDK module may be the implementation of one or more application programming interfaces (APIs) in the form of libraries. The SDK modules may be compiled and provided to the SDK platform backend.

In one or more embodiments of the invention, the SDK platform backend (105) may also provide an application marketplace for software applications. An application market is a virtual network space, supported by hardware and software that connects consumers of software applications to developers of software applications and facilitates the exchange of software applications. In at least some embodiments of the invention, the application market is a public market that is accessible via the Internet.

In one embodiment of the invention, the SDK platform backend includes a data repository (not shown). The data repository is any type of storage unit and/or device (e.g., a file system, database, collection of tables, or any other storage mechanism) for storing data. Further, the data repository may include multiple different storage units and/ or devices. The multiple different storage units and/or devices may or may not be of the same type or located at the same physical site. The data repository includes functionality to store, for example, system configurations data and user data. Other data may be stored in the repository without departing from the invention.

In one or more embodiments of the invention, system configurations data includes data describing the hardware and/or software configurations of all computing systems (see e.g., 100 in FIG. 1) upon which an application that includes a non-core SDK module instance (see FIG. 2, FIG. 4A-B) has been loaded. The system configuration data for a particular system may include identifying all a non-core SDK module instances (see FIG. 2. FIG. 4A-B) loaded on the computing device. The system configuration data may include an operating system identifier, a device manufacturer name and model name, a web browser name, and any other identifying information of a system configuration. The system configuration data for a particular system configuration may include additional information, such as the functionality provided by the system configuration, components of the system configuration, known defects of the particular system configuration, other such information, or a combination thereof.

In one or more embodiments of the invention, user data corresponds to data for a particular user (e.g., a user of a computing system (100 in FIG. 1)). User data may include a user profile and system configuration identifier. A user profile includes information about a user. For example, the user profile may include administrative information (e.g., name, address, email address, and other such information), market history information (e.g., financial account information to purchase on the market, identifiers of one or more applications and other goods purchased from the market), security information (e.g., account credentials, security questions for password reset, other security related information), or other information or a combination thereof. The system configuration identifier is a reference to the corresponding system configurations data for a computing system that the user is using. Rather having a separate system configurations data and user data, the system configurations data may be a part of the user data.

The use data may also include some or all of the following information: (i) the number of application on the computing system that includes non-core SDK module instances; (ii) information about which non-core SDK module instances are implemented in the computing system on a per-application basis; (iii) locally collected analytics information that provides non-core SDK module instance usage obtained from the computing devices; (iv) the application name (or other identifier) of each application that includes a non-core SDK module instance; and/or (v) a listing of application features for each application that includes a non-core SDK module instance. The aforementioned information may be communicated to the backend services/3.sup.rd party services (105) using any communication mechanism and in any data format The data in the user profile may be stored in any manner that compiles with applicable user privacy laws. Further, the data in the user profile may be stored in an anonymized form.

In one embodiment of the invention, the computing system (100) executes one or more applications (103A, 103B), where the one or more of the applications (103A, 103B) implements/includes at least one non-core SDK module instance (i.e., an instance of an SDK module) that is supported by the local SDK platform or the local SDK platform instances. In one embodiment of the invention, an application corresponds to executable code that may be executing by the computing system (100). Each non-core SDK module provides a particular type of functionality within the application in which it is implemented. Examples of non-core SDK modules include, but are not limited to, (i) an identity SDK module, which provides identification and/or verification functionality within the application (e.g., to allow a user to login into the application); (ii) a monetization SDK module, which allows the application to display advertisements within the application (e.g., native and non-advertisements); (iii) a payments SDK module, which allows the application to support in-application payments (e.g., users may purchase goods and/or service without leaving the application context); and (iv) an analytics module, which allows the developer to instrument the application and then subsequently collect various types of analytics information, such as, who is using the application, how the application is being used, etc.

The computing system (100) may be connected to the backend services/3.sup.rd party services (105) using any combination of wired or wireless network along with any known or future discovered communication protocol.

The invention is not limited to the system architecture shown in FIG. 1.

Figure 2:
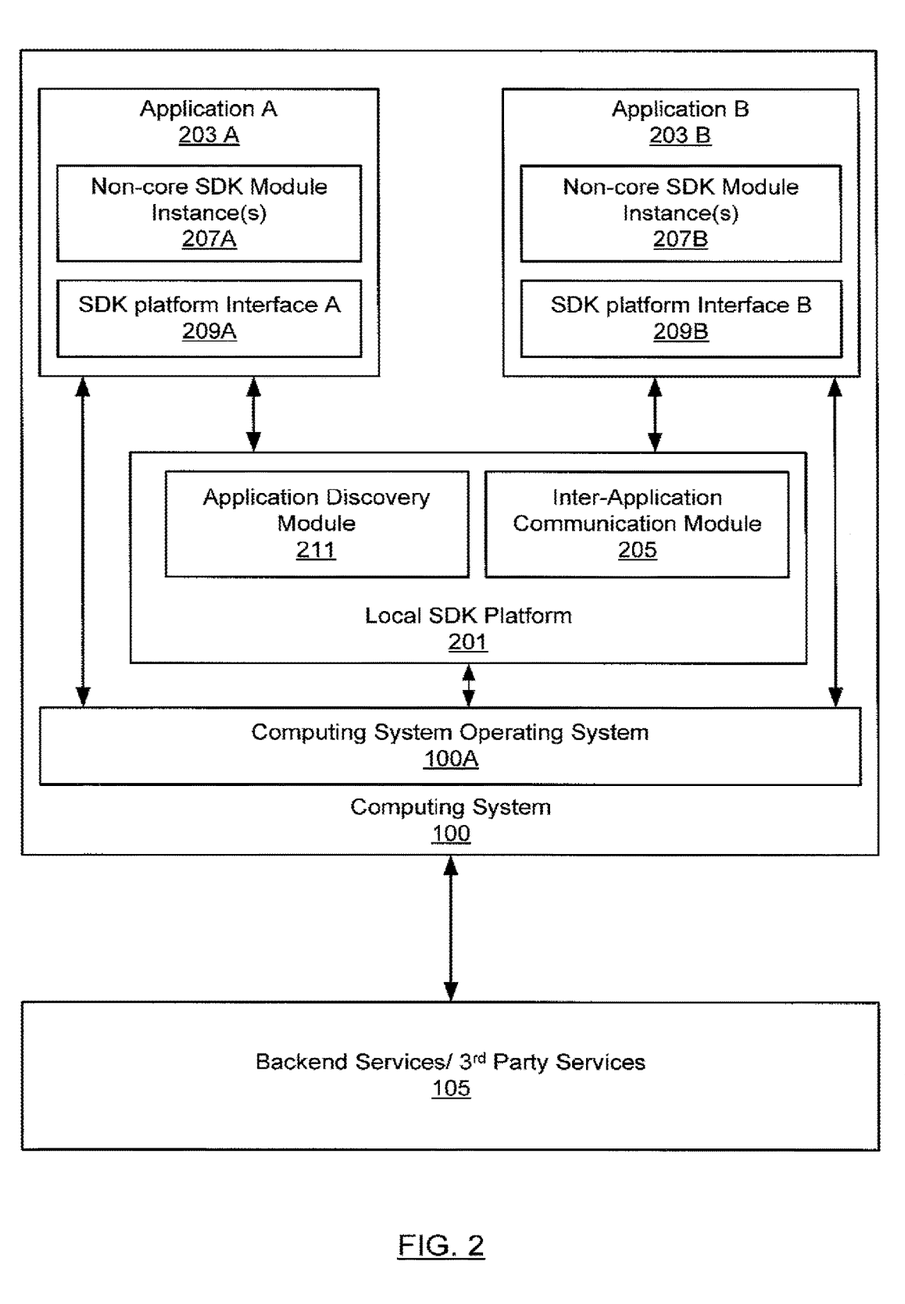
FIG. 2 shows a system with a local SDK platform in accordance with one or more embodiments of the invention.

FIG. 2 shows a system with a local SDK platform (201) in accordance with one or more embodiments of the invention. In one or more embodiments of the invention, the local SDK platform (201) enables applications (203A, 203B) executing on the same computing system (100) to share data. Further, the local SDK platform (201) enables applications (203A, 203B) on the computing system (100) to invoke the functionality of other applications (203A, 203B) on the computing system (100).

In one or more embodiments of the invention, the local SDK platform (201) includes an application discovery module (ADM) (211) that includes functionality to discovery which of the applications (203A, 203B) on the computing system (100) have one or more non-core SDK module instances (207A, 207B). Further, the ADM (211) may include functionality to query each such application (via the applications SDK platform interface (209A, 209B)) in order to determine which specific non-core modules (207A, 207B) are present in each of the applications (203A, 203B). Alternatively, the applications (203A, 203B) that include non-core SDK module instances (207A, 207B) may publish and/or "push" this information to the ADM (211). The ADM (211) may also be configured to store the collected and/or received information in a data structure that is operatively connected to (or within) the local SDK platform (201). The local SDK platform (201) may then use the information in the manner described herein.

The local SDK platform (201) may also include an inter-application communication module (IACM) (205) that enables the applications (203A, 203B), which include SDK platform interfaces (209A, 209B), to communicate. In one or more embodiments of the invention, the local SDK platform (201) may also include functionality to receive requests from applications (203A, 203B) executing on the computing system (100) and forward such requests (with or without modification) to the backend services/3.sup.rd party services (105) and provide responses received from the backend services/3.sup.rd party services (105) (without or without modification) to the applications (203A, 203B).

Further, the local SDK platform (201) may provide information that it has gathered (e.g., using the ADM (211)) to the backend services/3.sup.rd party services (105). For example, the local SDK platform (201) may send some or all of the following information to the backend services/3.sup.rd party services (105): (i) the number of application on the computing system that includes non-core SDK module instances; (ii) information about which non-core SDK module instances are implemented in the computing system on a per-application basis; (iii) locally collected analytics information that provides non-core SDK module instance usage; (iv) the application name (or other identifier) of each application that includes a non-core SDK module instance; and/or (v) a listing of application features for each application that includes a non-core SDK module instance. The aforementioned information may be communicated to the backend services/3.sup.rd party services (105) using the any communication mechanism and in any data format.

In one or more embodiment of the invention, each time an application (203A) is installed on the computing system (100), where the application (203A) includes at least one non-core SDK module instance (207A), the application (203A) (via the SDK platform interface (209A)) sends a message to the local SDK platform (201) to indicate that the application (203A) has been installed and the local SDK platform (201) sends information about the installation to a backend service/3.sup.rd party service (105). The backend service/3.sup.rd party service (105) then records this information and tracks which applications that includes non-core SDK modules are present on the computing system (100).

In one or more embodiments of the invention, one or more applications (203A, 203B) on the computing system (100) include one or more non-core SDK module instances (207A, 207B), other SDK modules (which are not supported by the local SDK platform) and/or other custom code. If the application (203A, 203B) includes one or more non-core SDK module instances (207A, 207B), the application (203A, 203B) may also include an SDK platform interface (209A, 209B) that allows the non-core SDK modules (207A, 207B) to communicate with, provide data to and/or receive data from the local SDK platform (201). Applications that include non-code SDK modules may: (i) issue requests directly to the computing system OS and/or to the backend services and or 3.sup.rd party services; and/or (ii) issue requests via the SDK platform interface to the local SDK platform.

Though not shown in FIG. 2, the computing system (100) may include other applications that do not include non-core SDK modules and/or that are not supported by the local SDK platform (201). The invention is not limited to the system architecture shown in FIG. 2.

In one or more embodiments of the invention, the local SDK platform (201) uses deep links in order to enable one application (203A) to initiate/trigger an action in another application 203B on the same computing system (100). In one embodiment of the invention, a deep link is a uniform resource identifier (URI) that links to a specific location within a target application. Further, the deep link may include other information such as the source of the deep link (i.e., the application from which the deep link was initiated, information about the location in the target application, information that may be used by the target application at the aforementioned location. The following is an exemplary deep link: MyApp://MAKE_PURCHASE?REFERRAL= App2&PRODUCT_id-20&GUID=100. In this example, the target application is MyApp, the source application is App2 (i.e., another application execution in the computing device), and the information passed from App2 to MyApp is product ID=20 and the GUID=100.

Figure 3:
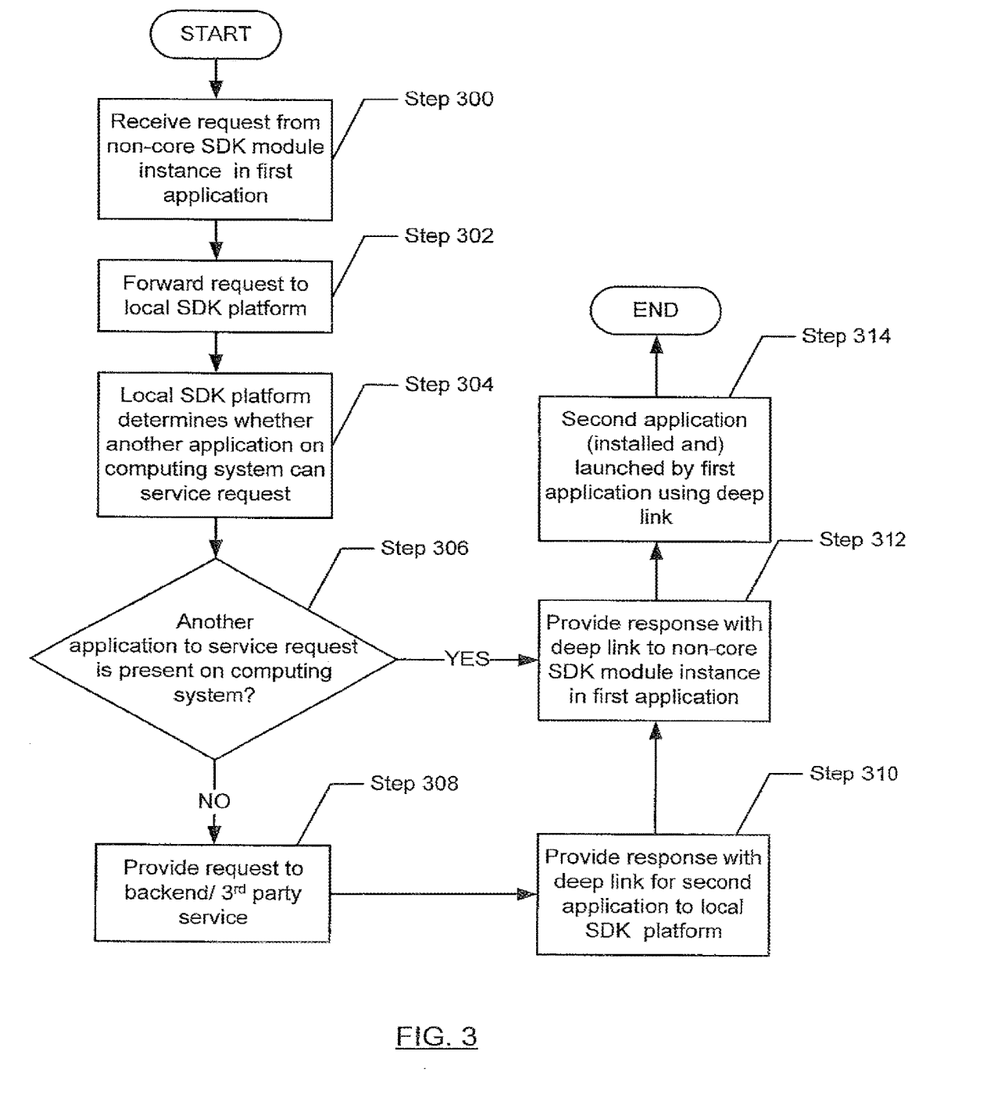
FIG. 3 shows a flowchart for servicing requests for deep links using the local SDK platform in accordance with one or more embodiments of the invention.

FIG. 3 shows a flowchart for servicing requests for deep links using the local SDK platform (201) in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In step 300, a request is received from a non-core SDK module instance (207A) (or, for example, the local SDK platform instance (401A)) in a first application (203A). The request may correspond to a request where the corresponding response includes a deep link. For example, the request may be for a native advertisement where the responding native advertisement includes a deep link to another application executing on the computing system. At the time of the request, the requesting application may not necessarily require a response with a deep link, e.g., in the scenario in which the application requests a native advertisements, there requesting application is able to receive any native advertisement as a response (including native advertisements that include or do not include a deep link). In one or more embodiments of the invention, the request may be an explicit request for a deep link. For example, the request application may include a "PURCHASE" button, that when selected by the user of the application triggers a purchase action. However, if the application does not natively support the purchase action, the application can send a request to the local SDK platform (201) in order to obtain a deep link for an another application on the computing system (100) that can handle the purchase action or to obtain a deep link to an application that must be downloaded onto the computing system (100) and then subsequently launched using the information in the deep link. These examples are not intended to limit the scope of the invention.

In step 302, the request is forwarded from the non-core SDK module instance (207A) (or, for example, the local SDK platform instance (401A)) to the local SDK platform (201) via the SDK platform interface (209A, 209B).

In step 304, the local SDK platform (201) determines whether another application (203B) on the computing system (100) can service the request. As discussed above, the local SDK platform (201) may include an ADM (211) that includes functionality to discovery which applications (that include non-core SDK modules) are supported by the local SDK platform (201). This information may be used to service the request. For example, if the request is for a purchase action, then the local SDK platform (201) may include functionality to determine if any of the applications (that include non-core SDK modules) can service the request, i.e., can service the purchase action. In another example, if the request is for a native advertisement, then the request may need to be serviced by the backend service or a 3.sup.rd party service (105). For example, the request may be sent to a backend service (e.g., Twitter) to obtain a native advertisement. In another example, the request may be sent to the backend service, which subsequently sends the request to a 3.sup.rd party service (e.g., a 3.sup.rd party ad exchange). The 3.sup.rd party advertisement exchange may then provide the native advertisement to the backend service, which may modify the native advertisement to include a deep link (e.g., a deep link to an application on the computing device that is to be triggered when a user clicks a button in the native advertisement). The modified native advertisement may then be returned to the computing system (100).

Continuing with the discussion of FIG. 3, in step 306, when another application (203B) on the computing system (100) can service the request (as determined in step 304) the process proceeds to step 312; otherwise, the process proceeds to the step 308.

In step 308, when the request cannot be serviced by another application (203B) that is currently present on the computing system (100), then a request is sent to the backend service or a 3.sup.rd party service (105) (see example discussed above).

In step 310, the backend service or a 3.sup.rd party service (105) provides a response that may include a deep link. Consider the following first example, if the request is for a native advertisement, the backend service or a 3.sup.rd party service (105) may select the native advertisement (using any known selection method) and the incorporate into the native advertisement a deep link. In this example, the deep link may correspond to an application that is present on the computing system (100) and may specify that when the application launches what screen is to be initially shown to the user via the user interface on the computing system (100). In the first example, the backend service or a 3.sup.rd party service (105) includes information (which may be obtained from the local SDK platform (201)) on which applications are present on the computing system (100) and the functionality of each of those applications.

Consider the following second example, if the request is for a native advertisement, the backend service or a 3.sup.rd party service (105) may select the native advertisement (using any known selection method) and then incorporate into the native advertisement a deep link. In this example, the deep link may correspond to an application that is not present on the computing system (100) and may also specify that when the application launches what screen is to be initially shown to the user via the user interface on the computing system. In the second example, the backend service or a 3.sup.rd party service (105) includes information on what other applications are available for download on the computing system (100) and the functionality of each of those applications.

Consider the following third example, if the request is for a native advertisement, the backend service or a 3.sup.rd party service (105) may select the native advertisement (using any known selection method) and then incorporate into the native advertisement a link to a website that supports, e.g., the purchase action. This may occur in scenarios in which there are no applications on the computing system (100) or available for download on the computing system (100) that can support the functionality required.

In step 312, if the method reaches step 312 via step 310, then the response (which was generated in step 310) is sent to the non-core SDK module (207A) (or, for example, the local SDK platform instance (401A)) in the first application (203A) via the SDK platform interface (209A, 209B) (with or without modification); alternatively, if the method reaches step 312 via step 306, then the local SDK platform (201) first generates the response the deep link, where the deep link may correspond to an application that is present on the computing system (100) and may specify that when the application is launched what screen to initially show the user via the user interface on the computing system (100). The local SDK platform (201) is able to generate a response without requesting information from the backend services and/or 3.sup.rd party services (105). The generated response is then sent to the non-core SDK module (207A) (or, for example, the local SDK platform instance (401A)) in the first application.

In step 314, in the scenario in which the second application (203B) is already loaded on the computing system (100), the selecting of the deep link in the first application (203A) launches the second application (203B) to a specific screen of the application (203B), where the specific screen is specified in the deep link. In the scenario in which the second application (203B) is not already loaded on the computing system (100), the selecting of the deep link in the first application (203A) triggers the downloading of the second application (203B) onto the computing system (100). Once downloaded, the second application 103B is launched to a specific screen of the application (203B), where the specific screen is specified in the deep link. Finally, in the scenario in which the response includes a link to a website, the selecting of the link in the first application (203A) launches a web browser application that displays the particular webpage as specified in the link.

Figure 4A:
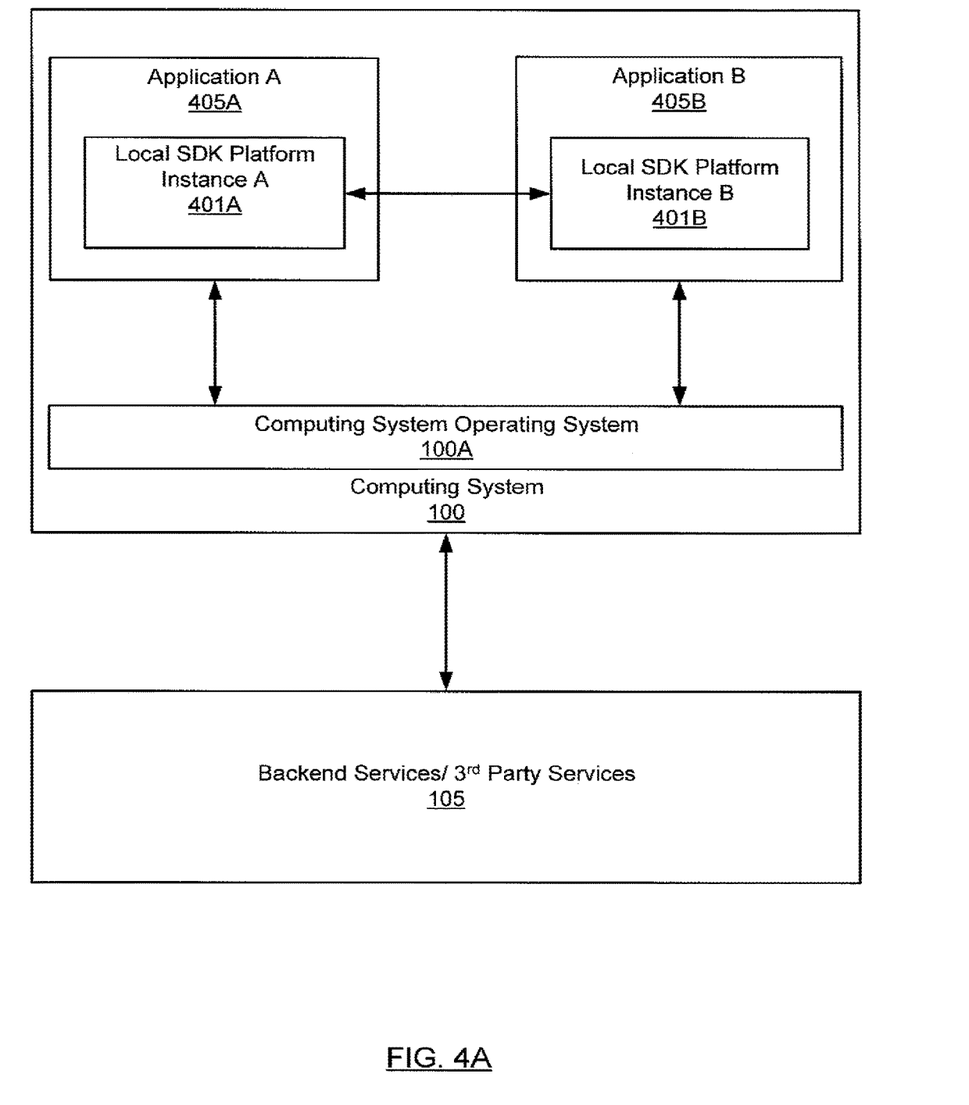
FIG. 4A shows a system with a local SDK platform instances in accordance with one or more embodiments of the invention.
Figure 4B:
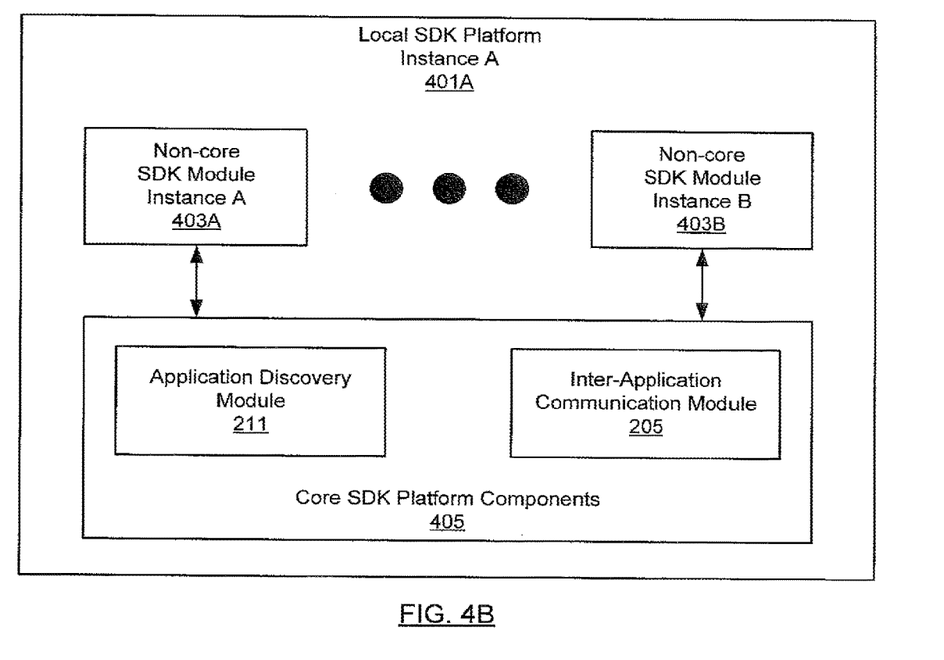
FIG. 4B shows a local SDK platform instance in accordance with one or more embodiments of the invention.

FIG. 4A shows a system with local SDK platform instances 401A, 401B in accordance with one or more embodiments of the invention. The system shown in FIG. 4A is substantially similar to the system shown in FIG. 2 except that in FIG. 4A, there is no common local SDK platform (201); rather there is one instance of an local SDK platform (401A, 401B) associated with (or within) each application (405A, 405B). The local SDK platform (401A, 401B) instances perform the same functionality as the local SDK platform (201) shown in FIG. 2. Further, as shown in FIG. 4B, the local SDK platform instances (401A, 401B) also can each include one or more non-core SDK modules 403A, 403B. The invention is not limited to the system architecture shown in FIGS. 4A-4B.

The following describes various examples in accordance with one more embodiments of the invention. The invention is not limited by the following examples.

Example (Purchase of Goods from Another Application Via Deep Link)

The following example is not intended to limit the scope of the invention. In one or more embodiments of the invention, the local SDK platform provides generalized action identifiers which developers can elect to support in their application. One of these identifiers may be "PURCHASE" that has supporting data fields for "PRODUCT ID."

Application B leverages the local SDK platform. Specifically, in this example, it registers its checkout screen as the "PURCHASE" action. Likewise, it registers this part of the application to handle in-bound product IDs to populate the user's shopping cart. The registration process may be managed by the application discovery module in the local SDK platform.

Application A 405A is a Sports news application that also leverages the local SDK platform. Through the monetization SDK module (i.e., a non-core SDK module) Application A displays native advertisements. The local SDK platform is also able to determine that Application B is installed, so Application A presents an advertisement for a San Francisco Giants hat available in Application B, where the local SDK platform (201) generates a deep link that is included in the advertisement. When selected, the deep link associated with the advertisement triggers a call(s) to launch Application B and passes the "PURCHASE" action, with "PRODUCT ID" 30.

Once Application B launches, the local SDK platform (201) looks up the appropriate screen for the "PURCHASE" action. The appropriate screen may be specified in the aforementioned deep link or may be determined using any other known mechanism. Application B displays this screen, along with the product id of 30. The user continues through the purchase flow to purchase the hat, and then is re-redirected to Application A 405A via the local SDK platform (201).

This deep link used in the advertisement may also be used to pass data back to Application A 405A that indicates successful purchase. This resultant data can be used to inform other advertisements, or it can be used to allow the user to share his or her new purchase with his or her followers on a social network (e.g., his or her followers on TWITTER). The data that indicates a successful purchase may also be provided to a backend service or 3.sup.rd party, where this information may be used to further target the user via Application A or Application B.

Example (Purchase of Goods from Another Application Via Deep-Link Scheme)

The following example is not intended to limit the scope of the invention. Applications A, B, C, and D are respectively a sports application, a travel application, an event purchasing application, and a shopping application. We make the following assumptions: (1) Sam will be in Atlanta on Tuesday, and (2) San Francisco Giants will be playing a game with Atlanta Braves on Tuesday.

The applications each interact with a common local SDK platform. Sam is using Application A to browse sports news. Sam encounters information on a team of his interest, e.g., San Francisco Giants. Sam follows San Francisco Giants by clicking on a TWITTER FOLLOW button embedded and displayed in the news of Application A. This action results in a new "following" in the Sam's social graph on TWITTER. Knowing that Sam just followed San Francisco Giants, the monetization SDK module instance of Application B subsequently requests advertisements to display relevant advertisements for Sam. Application B is a travel application that may be able to obtain Sam's location and/or has access to Sam's travel plans. Combining information on Sam's new "following" and Sam's going travel plan to Atlanta on Tuesday, the monetization SDK module instance of Application B provides advertisements, which may be displayed in Application A or B, that advertise tickets for the Tuesday game. The advertisements may be embedded with deep link. The monetization SDK module instance or the payment SDK module instance of Application B may send Sam to Application C, an event purchasing application, via the deep link when Sam interacts with any of the advertisements that advertises tickets for the Tuesday game. Further, Sam may have previously input payment information when making a purchase on Application D. His payment information is automatically obtained (via the local SDK platform) from the payment SDK module instance of Application D. Thus, Sam only needs to click "PURCHASE" to complete his purchase of the tickets to the games in Application C.

Knowing that Sam purchased a ticket to the San Francisco Giants game on Tuesday confirms Sam's interest in San Francisco Giants. When executing Applications A-D in the future, the advertisements will likely display more San Francisco Giants advertisements to Sam (i.e., San Francisco Giants baseball cap).

If Sam does not purchase the ticket to the San Francisco Giants game upon being redirected to Application C by the monetization SDK module instance of Application B, Applications A-D may continue to sent (perhaps increase advertisement impression frequency) advertisements that advertise tickets for the Tuesday game until expiration of the event (the day after the game takes place). Although advertisements for the tickets for the Tuesday game are "time-sensitive" and would terminate when the event ends, advertisements that are not time-sensitive (i.e., San Francisco Giants merchandise) may continue to be sent to Sam as he executes Applications A-D.

Non-Core SDK Module Examples

The following section describes various non-core SDK modules in accordance with one or more embodiments of the invention. The non-core SDK modules are not limited to those listed below.

Identity SDK Module

In one or more embodiments of the invention, the identity SDK module instance may send an authorization request to authenticate, for example, a user accessing the application on a computing system. The authorization request can include an identifier (e.g., phone number, electronic mail address, facsimile number, social security number, etc.) that identifies the computing system. Alternatively, the identifier can be a unique client identifier that identifies the computing system (e.g., device identification).

While the identity SDK module instance of the application can communicate directly or indirectly with a backend service or 3.sup.rd party service to authenticate the computing system, the identity SDK module instance of the application may also communicate directly or indirectly with the identity SDK module instance of another application on the same computing system so as to authenticate the application.

The following is an example use case from the identity SDK module instance. Consider a scenario in which a user is already logged into a first social media application and now the same user is attempting to log into a second social media application. When the user, for example, executes the second social media or clicks on "LOGIN" in a screen of the second application, the authorization request may be sent. The local SDK platform is able to forward the authorization request from the identity SDK module instance of the second social media application to the identity SDK module instance of the first social media application. Because the user is already logged into the first application, the identity SDK module instance of the first social media application, upon receipt of the authorization request, returns the authorization request to the second social media application and allows the user to gain access to the second application without requiring the user to input his or her credentials. The identity SDK module instance according to one or more embodiments of the invention may keep track of a user's movement across a plurality of applications, which, coupled with other non-core SDK module instances, may be beneficial to advertisers, developers, and others alike.

Alternatively, the identity SDK module instance of the application may seek user authentication with a system external to the computing system. The system may or may not be a backend service or 3.sup.rd party service. The system comprises an identity SDK module instance that can include functionality to receive, from the computing system, the authorization request. As discussed above, the authorization request can comprise an identifier that identifies the computing system. The identity SDK module instance of the computing system can include functionality to determine that the computing system identified by the identifier corresponds to an account of the identity SDK module instance. The identify SDK module instance may include an account repository that maintains an account index that identifies computing systems and their corresponding accounts. For example, the account index may include a listing of identifiers that identify the client devices that have an account with the identity SDK module instance of the system. The identity SDK module instance can further include an authentication SDK module instance that includes functionality to communicate with the account repository to search the account index based on the identifier received in the authorization request. If the authentication SDK module instance of the identity SDK module instance finds a matching identifier in the account index, the authentication SDK module instance can identify the account corresponding to the computing system identified by the identifier. Subsequently, the system may return the authorization request and enable the user to access the application.

According to one or more embodiments of the invention, the identity SDK module instance of the system can also include functionality to transmit, in response to the authorization request, a verification message verifying that the computing system is authenticated and a unique token of the account, where the unique token is unique to the application. The unique token can be used to maintain the privacy of the user of the computing system from the application. For instance, upon receiving the unique token from the identity SDK module instance, the application can transmit the unique token to an application server associated with the application to access application data associated with the unique token. The computing system can then be provided with access to the user account managed by the application server using only the unique token.

Monetization SDK Module

In one or more embodiments of the invention, the monetization SDK module uses information/signals from the identity SDK module for targeting, cross-promotion, and/or marketing. Some of this information/signals is explicit, and some of these signals are implicit or derived from the explicit information.

The following is an example use case from the monetization SDK module. Consider a scenario in which a user's social graph in a social network includes his followers and those whom he follows. If the social network determines that a user follows x accounts related to the San Francisco Giants, it can tailor the advertisements served via the monetization SDK module instance. If an application leverages the local SDK platform and includes the identity SDK module instance and the monetization SDK module instance, then the application can quickly benefit from this data Further, location data obtained from the user's previous posts can provide valuable data for monetization, without the application that is displaying advertisements needing to explicitly ask for the user's location. If the user has posted 2,000 times from San Francisco, and is currently inside a sports application which leverages the local SDK platform, the application is able to quickly ascertain) that there's a high likelihood that news and merchandise related to Bay Area sports teams are relevant to the user.

Other inferred data, such as the applications that the user has installed (which can be determined if the applications on the device leverage the local SDK platform), may be important for monetization purposes. For example, if the user has downloaded and authenticated with three applications which are of the genre 'sports' (the genre can be obtained through various means, including directly from the various platform stores), a backend service can ensure that all applications on the device which leverage the monetization SDK module can benefit from this data by displaying advertisements which are relevant to the user's interests in the installed applications.

In one or more embodiments of the invention, the monetization SDK module may (i) use real-time insights into the user's interests to provide timely advertisements on mobile device; (ii) leverage data from other applications that are installed on the same device for targeting; (iii) provide advertisements based on social context; and/or (iv) establish a cross-application advertising system.

As discussed above, deep links are used to enable one application to trigger the launching of another application. In one embodiment of the invention, a given application may be associated with multiple different deep links, where each deep link launches the application to a different screen. The monetization SDK module instance may use the 1:many relationship of an application to deep links in various advertisements. For example, the monetization SDK module instance may show advertisement 1 that includes deep link 1 and advertisement 2 that includes deep link 2, etc., where each of the advertisements launches the same application. The selection of deep links to include in a given advertisement may be performed at random The analytics SDK module instance (described below) can then be used to track, e.g., a user's use of the application. In this manner, the monetization SDK module instance provides a mechanism for performing A/B testing (or testing similar to A/B testing) in order to determine which screen on the launched application drives the most application usage, etc.

Payments SDK Module

In one or more embodiments of the invention, the payments SDK module instance supports in-application payment processing. For example, if a social network collects a payment mechanism (e.g., credit card) and attaches it to the user's identity, it can provide actionable advertisements which can lead directly to purchases, all within the application which implements the local SDK platform instances or interact with the local SDK platform.

If the local SDK platform provides the payments SDK module instance for payments for 3rd party developers, a developer can leverage the payments SDK module instance to receive payment for their own goods, virtual or physical.

Further, the identity of the mobile user, combined with the applications on the user's mobile device which also leverages the local SDK platform, can provide a strong signal for purchase intent. For example, if a user searches a social network for "giants home opener", then opens a ticket application which leverages the local SDK platform, the application can quickly know that the user is "primed" to make a purchase of tickets to watch the SF Giants, and can present a large call-to-action in the application's home screen to purchase these tickets.

With the payments SDK module instance, a backend service or 3.sup.rd party service can facilitate 1:1 or 1:many payments between users. For example, if a user makes a reservation for dinner with friends in an application, and the application leverages the local platform SDK, the payments SDK module instance can request that each of the friends pay the user via a backend service or 3.sup.rd party service after the dinner.

In one or more embodiments of the invention, the payments SDK module may: (i) enable a mapping to be made between the user's social graph and his payment mechanisms; (ii) make purchases seamlessly for the user, after the user has authenticated with application, he does not need to enter credit card information to complete a purchase; and (iii) facilitate private transactions between users of a social network using direct messaging/private messaging type features in combination with the payment SDK module.

Analytics SDK Module

The analytics SDK module provides the ability for a developer to instrument his application to track various information about the application and its usage. The analytics SDK module may be used in combination with the identity SDK module. For example, an application can have an account which users interact with for customer support purposes. If backend services knows the identity of an application's account on the social network (e.g. @MySuperApp), and on a certain day mentions of this account sharply increase, the analytic SDK module instance can combine this data with application session data to alert the developer that something occurred to negatively or positively affected his application.

The analytics SDK module instance may also be used to encourage developers to use monetization products. For example, if an application (via analytics SDK module instance installed on each computing system) sees an aggregate 4,999 active sessions in a day, and the backend services (using information about the various installed analytics SDK module instance) can determine that applications with 5,000 sessions typically make $50 a day if they include native advertisements, it can provide the developer with this information. The developer can then elect to implement the monetization SDK module to see these benefits when the application presumably hits 5,000 users shortly thereafter. The data necessary to generate aforementioned aggregated information may be obtained on a per-computing system basis by the backend services (or 3.sup.rd party services) and then aggregated using the backend services or 3.sup.rd party services.

The analytics SDK module may also drive the usage of the identity SDK module. For example, when an application leverages the identify SDK module instance to enable a user to sign-in, the analytics SDK module instance is able to provide better insight into more than just the number of active users the application saw during a given time period. For example, instead of just saying "You had 100 users yesterday", the analytics SDK module instance may be able to ascertain, based on the collected data and by leverage the identify SDK module instance (which may be used to obtain users' profiles from which interests may be determined), that "You saw 50 users yesterday who were interested in football, and 50 users who were interested in baseball."

The analytics SDK module may help developers understand how other applications lead users to their own application(s). Referrals to applications are also important for advertisers or non-advertisers. Specifically, the use of deep links (as described above) may be used to determine which applications are the best referrers for other applications.

In one or more embodiments of the invention, the analytics SDK module may: (i) enable tracking of how the users behave inside an application, where this information can be combined with other data about the user, to inform the developer's product development process; (ii) provide benchmarks about how given types of applications should be performing based on information obtained from computing systems that implement the local SDK platform; (iii) be used to drive application installation campaigns which are more effective by targeting users who are most active in similar applications; (iv) be used to inform a developer when his or her application's performance changes, either positively or negatively; and (v) be used to establishing an on-device referral tracking network, where the referral tracking network tracks which applications refer which other applications (via, e.g., advertisements etc.)

Figure 5:
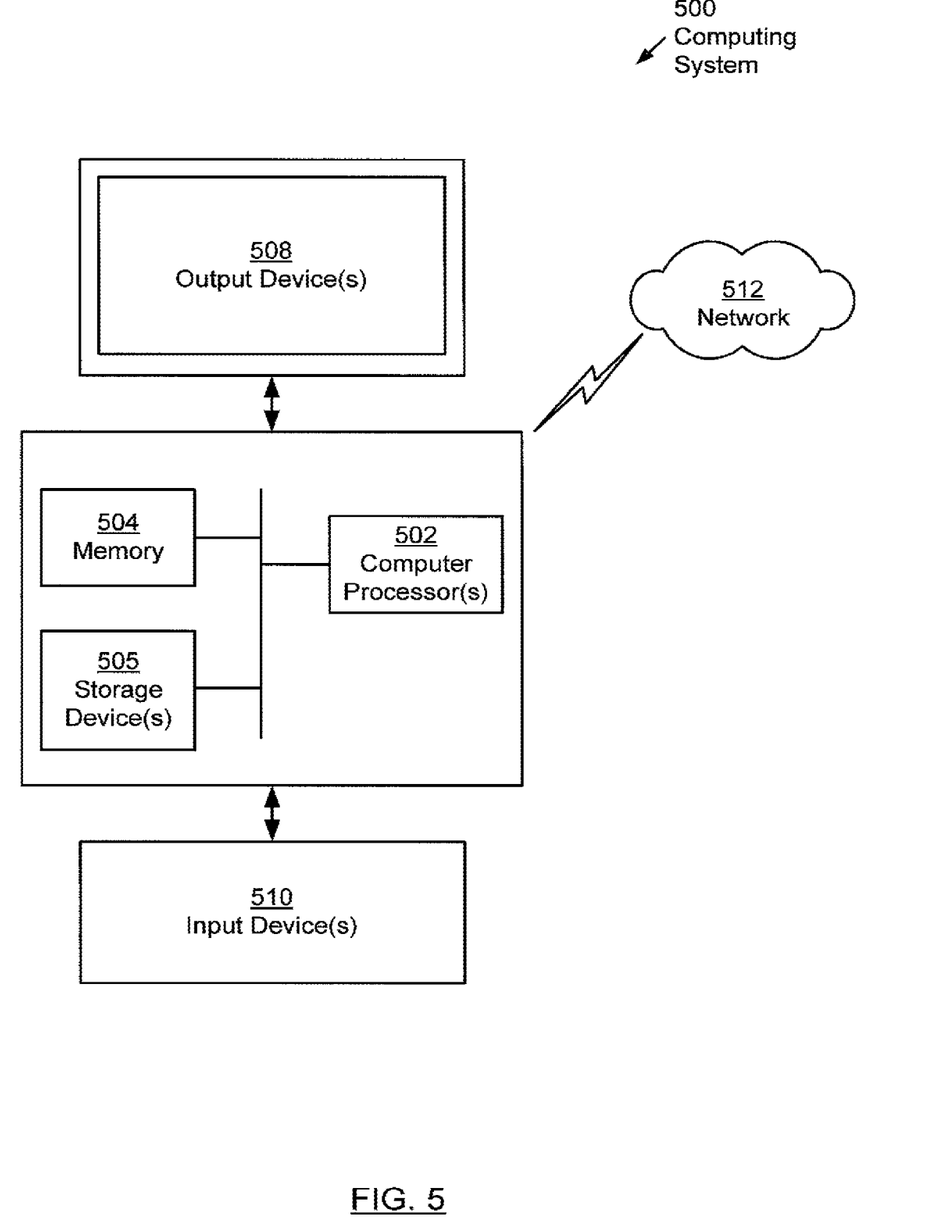
FIG. 5 shows a computing system in accordance with one or more embodiments of the invention.

Embodiments of the invention may be implemented on virtually any type of computing system 500 regardless of the platform being used. For example, the computing system 500 may be one or more mobile devices (e.g., laptop computer, smart phone, personal digital assistant, tablet computer, or other mobile device), desktop computers, servers, blades in a server chassis, or any other type of computing system or devices that includes at least the minimum processing power, memory, and input and output device(s) to perform one or more embodiments of the invention. For example, as shown in FIG. 5, the computing system 500 may include one or more computer processor(s) 502, associated memory 504 (e.g., random access memory (RAM), cache memory, flash memory, etc.), one or more storage device(s) 505 (e.g., a hard disk, an optical drive such as a compact disk (CD) drive or digital versatile disk (DVD) drive, a flash memory stick, etc.), and numerous other elements and functionalities. The computer processor(s) 502 may be an integrated circuit for processing instructions. For example, the computer processor(s) may be one or more cores, or micro-cores of a processor. The computing system 500 may also include one or more input device(s) 510, such as a touchscreen, keyboard, mouse, microphone, touchpad, electronic pen, or any other type of input device. Further, the computing system 500 may include one or more output device(s) 508, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 500 may be connected to a network 512 (e.g., a local area network (LAN), a wide area network (WAN) such as the Internet, mobile network, or any other type of network) via a network interface connection (not shown). The input and output device(s) may be locally or remotely (e.g., via the network 512) connected to the computer processor(s) 502, memory 504, and storage device(s) 505. Many different types of computing systems exist, and the aforementioned input and output device(s) may take other forms.

Software instructions in the form of computer readable program code to perform one or more embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 500 may be located at a remote location and connected to the other elements over a network 512. Further, embodiments of the invention may be implemented on a distributed system having a plurality of nodes, where each portion of the invention may be located on a different node within the distributed system. In one or more embodiments of the invention, the node may correspond to a distinct computing system. Alternatively, the node may correspond to a computer processor with associated physical memory. The node may alternatively correspond to a computer processor or micro-core of a computer processor with shared memory and/or resources.

What is claimed is:

1. A computer-implemented method comprising:
   receiving, by a local software development kit (SDK) platform on a computing device and from a local SDK platform instance both on the computing device and of a requesting application on the computing device, a request for an object that is not natively supported by the requesting application;
   determining, by the local SDK platform on the computing device, that a servicing application configured for execution on the computing device is able to service the request;
   in response to determining that the servicing application configured for execution on the computing device is able to service the request, generating, by the local SDK platform, a deep link that links to a particular screen of the servicing application; and
   transmitting, by the local SDK platform on the computing device, the deep link to the local SDK platform instance both on the computing device and of the requesting application.

2. The method of claim 1, wherein determining that the servicing application configured for execution on the computing device is able to service the request comprises determining whether the servicing application is installed on the computing device.

3. The method of claim 2, wherein determining whether the servicing application is installed on the computing device comprises:
   determining that the servicing application is not installed; and
   in response to determining that the servicing application is not installed, automatically downloading the service application which is configured to execute a local SDK platform instance of the servicing application.

4. The method of claim 2, wherein determining whether the servicing application is installed on the computing device comprises:
   determining that the servicing application is installed; and
   in response to determining that the servicing application is installed, generating the deep link that corresponds to the servicing application without requesting information from backend services or third-party services.

5. The method of claim 1, comprising:
   receiving data indicating selection of the deep link that corresponds to the servicing application; and
   executing a local SDK platform instance of the servicing application.

6. The method of claim 5, wherein executing a local SDK platform instance of the servicing application comprises automatically launching a particular screen of the servicing application that is specified by the deep link.

7. The method of claim 1, wherein the request for the object that is not natively supported by the requesting application corresponds to one or more of a trigger for a purchase action and a request for a digital component.

8. The method of claim 1, wherein determining that the servicing application is able to service the request comprises determining that the servicing application able to service the request is supported by the local SDK platform.

9. A system comprising:
   one or more computers and one or more storage devices storing instructions that are operable, when executed by the one or more computers, to cause the one or more computers to perform operations comprising:
   receiving, by a local software development kit (SDK) platform on a computing device and from a local SDK platform instance both on the computing device and of a requesting application on the computing device, a request for an object that is not natively supported by the requesting application;

determining, by the local SDK platform on the computing device, that a servicing application configured for execution on the computing device is able to service the request;

in response to determining that the servicing application configured for execution on the computing device is able to service the request, generating, by the local SDK platform, a deep link that links to a particular screen of the servicing application; and transmitting, by the local SDK platform on the computing device, the deep link to the local SDK platform instance both on the computing device and of the requesting application.

10. The system of claim 9, wherein determining that the servicing application configured for execution on the computing device is able to service the request comprises determining whether the servicing application is installed on the computing device.

11. The system of claim 10, wherein the operation of determining whether the servicing application is installed on the computing device comprises:

determining that the servicing application is not installed; and in response to determining that the servicing application is not installed, automatically downloading the service application which is configured to execute a local SDK platform instance of the servicing application.

12. The system of claim 10, wherein the operation of determining whether the servicing application is installed on the computing device comprises:

determining that the servicing application is installed; and in response to determining that the servicing application is installed, generating the deep link that corresponds to the servicing application without requesting information from backend services or third-party services.

13. The system of claim 9, wherein the operations comprise:

receiving data indicating selection of the deep link that corresponds to the servicing application; and executing a local SDK platform instance of the servicing application.

14. The system of claim 13, wherein the operation of executing a local SDK platform instance of the servicing application comprises automatically launching a particular screen of the servicing application that is specified by the deep link.

15. A non-transitory computer-readable medium storing software comprising instructions executable by one or more computers which, upon such execution, cause the one or more computers to perform operations comprising:

receiving, by a local software development kit (SDK) platform on a computing device and from a local SDK platform instance both on the computing device and of a requesting application on the computing device, a request for an object that is not natively supported by the requesting application;

determining, by the local SDK platform on the computing device, that a servicing application configured for execution on the computing device is able to service the request;

in response to determining that the servicing application configured for execution on the computing device is able to service the request, generating, by the local SDK platform, a deep link that links to a particular screen of the servicing application; and transmitting, by the local SDK platform on the computing device, the deep link to the local SDK platform instance both on the computing device and of the requesting application.

16. The non-transitory computer-readable medium of claim 15, wherein the operation of determining that the servicing application configured for execution on the computing device is able to service the request comprises determining whether the servicing application is installed on the computing device.

17. The non-transitory computer-readable medium of claim 16, wherein the operation of determining whether the servicing application is installed on the computing device comprises:

determining that the servicing application is not installed; and in response to determining that the servicing application is not installed, automatically downloading the service application which is configured to execute a local SDK platform instance of the servicing application.

18. The method of claim 1, wherein generating, by the local SDK platform, a deep link that links to a particular screen of corresponds to the servicing application comprises:

generating the deep link based on data collected by the local SDK platform instance of the requesting application.

19. The method of claim 1, wherein generating, by the local SDK platform, a deep link that links to a particular screen of corresponds to the servicing application comprises:

generating the deep link based on (i) data collected by the local SDK platform instance of the requesting application and (ii) data from another application on the computing device.

20. The method of claim 1, wherein the local SDK platform comprises a non-core SDK module instance.

* * * * *